Patented Jan. 2, 1951

2,536,334

UNITED STATES PATENT OFFICE 2,536,334

PROCESS FOR MAKING SOLUTIONS OF CELLULOSE AND RESULTING PRODUCT

Ernst Weiss, Wattwil, Switzerland, assignor, by mesne assignments, to Sidney M. Edelstein, Elizabeth, N. J.

No Drawing. Application August 23, 1946, Serial No. 692,732. In Switzerland October 30, 1945

10 Claims. (Cl. 106—203)

The invention relates to a process for producing cellulose solutions and to the product resulting therefrom. The invention is particularly suitable for use in the textile industry.

It has heretofore been proposed to produce solutions of cellulose in sodium hydroxide containing zinc oxide, but in preparing these solutions, relatively low temperatures—about 5° C.—have been employed, increasing the expense of the process because of the required cooling. In addition, the method heretofore proposed for dissolving the cellulose in the sodium hydroxide and zinc oxide has not given satisfactory results, producing faulty solutions.

The principal object of the invention accordingly is to provide a simple process for dissolving cellulose, employing reagents of the kind mentioned to produce substantially uniform solutions of cellulose which will remain stable without gelatinizing sufficiently long to permit their practical application to textiles or other materials.

The invention accordingly comprises the novel products as well as the novel processes and steps of processes according to which such products are manufactured, the specific embodiments of which are described hereinafter by way of example and in accordance with which I now prefer to practice the invention.

According to the present invention the process for the preparation of stable non-gelatinizing cellulose solutions comprises swelling natural or regenerated cellulose in caustic soda solution of at least 20% which contains zinc oxide in solution, in the presence of small quantities of substances having the general formula Halogen.CH$_2$.R and then dissolving by dilution. In the formula R signifies one of the following groups: Hydroxyalkyl e. g. —CH$_2$OH, carboxyl or alkyl carboxyl —COOR', alkoxyl —OR', aldehyde or alkyl carbonyl —COR' and alkylen oxide

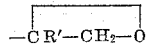

where R' is hydrogen or an alkyl radical of not more than 2 carbon atoms. Alkyl radicals of not more than 2 carbon atoms are the methyl and ethyl radicals. Such substances that promote solution are for example: Chloroacetic acid ClCH$_2$—COOH; chloroacetic acid ester ClCH$_2$—COOCH$_3$; chloroacetaldehyde ClCH$_2$CHO, monochloroacetone ClCH$_2$—COCH$_3$; ethylene chlorohydrin ClCH$_2$—CH$_2$—OH; chloromethylether ClCH$_2$—O—CH$_3$; epichlorohydrin

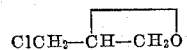

The advantages of the process in accordance with the invention are established above all in the rapid and convenient mode of preparation with which such cellulose solutions can be produced, in contrast to the known processes. Cooling is unnecessary in connection with it. The cellulose solutions obtained in accordance with the invention are extremely homogeneous and do not gelatinize. In consequence of their thinly liquid constitution they are also more suitable for impregnation of textiles than solutions of higher viscosity, which are usually obtained by the known processes.

Both natural and regenerated cellulose are suitable as starting material for preparation of the cellulose solutions, as for instance, wood pulp, cotton linters, viscose and other artificial silk waste.

The solution containing zinc is advantageously prepared by dissolving 1 part by weight of zinc oxide in a solution containing 3 parts by weight of caustic soda in the hot state at about 110° C. The concentrated solution is advantageously first diluted only so far that the total alkali content, calculated as NaOH, does not drop below 20%. In case of the use of natural cellulose for the preparation of the cellulose solutions the work is expediently carried on with higher initial concentrations.

The cellulose material is introduced into the completed solution, for example, by mixing it with the caustic solution containing zinc and then adding a small quantity of the substances mentioned above and allowing it to remain for about 2 to 24 hours. It is then dissolved by dilution with water or weak caustic soda solution, in which connection it is advantageous to see to it that the final alkali content of the solution does not amount to more than 10% calculated as NaOH.

The zinc oxide content of the caustic solution used for the swelling is preferably 5 to 15%.

In all cases the swelling in the caustic solution containing zinc, in the presence of the aforesaid substances, causes the cellulose upon subsequent dilution to pass into solution more rapidly and more completely than in the known processes, and very stable non-gelatinizing solutions are produced.

The following examples show how the cellulose solutions, which are particularly useful for the impregnation of textiles, can be produced.

Further examples show the application of such solutions to textiles.

*Examples*

1. 5 kgs. of short-cut waste of viscose artificial silk are mixed well at room temperature with 35 kgs. of a solution of sodium zincate containing 21.5% of total alkali, calculated as NaOH
7.0% of zinc oxide Whereupon, while vigorously kneading, one slowly adds 1 kg. of ethylene chlorohydrin, $ClCH_2CH_2OH$. The mass is now allowed to remain in a closed vessel at room temperature for 2 to 3 hours. Thereupon the mass, with intense stirring, is diluted with 59 kgs. of water at room temperature, in which procedure the cellulose passes into solution. There results a well-flowing homogeneous cellulose solution, which does not gelatinize even upon standing for several weeks.

2. Four kgs. of cotton linters are thoroughly mixed with 25 kgs. of sodium zincate solution containing 30% total alkali calculated as NaOH and 10% of zinc oxide, and immediately thereafter have added to them, with concomitant stirring 1 kg. of monochloroacetic acid, $$ClCH_2COOH$$

dissolved in 2 liters of water. The whole is now allowed to remain at room temperature, expediently in a rotating drum, for 24 hours. Thereafter, with concomitant stirring, 68 kgs. of 1% caustic soda solution, an aqueous diluent, are gradually added at room temperature, in which procedure the linters pass into solution. The solution is stable in storage.

3. Five kgs. of sulfite wood pulp are thoroughly mixed in a stuff grinder with 26 kgs. of a caustic solution containing 30% total alkali calculated as NaOH and 8% of ZnO; thereupon there are added, with concomitant constant stirring, 1.5 kgs. of epichlorohydrin,

and the mass is then allowed to remain at room temperature for 2 days. Thereafter 67.5 kgs. of an aqueous diluent, namely, water, are slowly stirred in, in which procedure the pulp passes into solution, which is stable.

4. In a kneading machine 5 kgs. of viscose artificial-silk waste are mixed successively with 30 kgs. of sodium zincate solution containing 25% total alkali calculated as NaOH and 7% of zinc oxide, and 1.2 kgs. of monochloromethylethyl ether, and the mass is then further kneaded for 2 hours at room temperature. Thereupon, with concomitant constant stirring, one adds slowly 63.8 kgs. of 1% caustic soda solution at room temperature, in which procedure a stable cellulose solution is obtained.

Each of the substances mentioned in the above examples as monochloroacetic acid, ethylene chlorohydrin and so on may be substituted in corresponding molecular amounts by any one of the other materials falling under the general formula Halogen—$CH_2R$ as monochloro acetic ester, chloroacetaldehyde and monochloroacetone. Instead of the chlorocompound corresponding bromo- and iodo compounds may be applied as well.

Cellulose solutions which are produced in this way are very suitable for the finishing of fabrics, in which connection, according to the type of the fabrics and the choice of the conditions in the application of the cellulose solutions, the most varied finish effects can be obtained. The finish effects that are obtained are extremely fast to washing.

If, for example, bleached, mercerized, if desired, cotton muslin is impregnated with the cellulose solution that is obtained in accordance with Example 1 and is immediately thereafter treated with caustic soda solution of mercerizing strength, one obtains a typically transparent, only moderately stiffened fabric.

If, on the other hand, one treats cotton cretonne, for example, on two successively placed impregnation foulard machines, on the first with a solution diluted to a cellulose content of 4% and on the second with a precipitating bath containing per liter 25 cc. of concentrated sulfuric acid and 75 grams of crystallized Glauber's salt, and thereupon thoroughly washes, dries on a tension frame, and finally calenders the goods, one obtains a fine linenlike finish.

A similar linen finish is obtained under analogous conditions also on spun rayon fabrics.

Interesting finish effects are also obtained on voile and marquisette. If such fabrics are impregnated with solutions diluted, for example, to a cellulose content of 3% and immediately thereafter mercerized under tension, one obtains a slight stiffening that is fast to washing and the typical somewhat sandy voile feel; the fabric structure furthermore becomes perceptibly clearer and more characteristic.

Solutions prepared by the above methods can also be imprinted upon fabrics. If, for example, one imprints cotton muslin with a solution containing 6% of cellulose and subjects the fabric after prior drying to a shrinking mercerisation, one obtains transparent, non-shrunk, more or less undulated printed areas on a non-transparent densified ground.

If one imprints cellulose solutions to which pigments have been added upon heavier fabrics and thereupon treats them with an acid precipitating bath, there result matt printed effects which impart to the fabric a damasklike appearance.

What I claim is:

1. A process for producing a solubilized cellulose which consists essentially of treating cellulose with a solution of sodium zincate of alkali content corresponding to at least 20% calculated as sodium hydroxide and in contact with a substance selected from the group consisting of ethylene chlorhydrin, monochloracetic acid, monochlormethyl ether and epichlorhydrin.

2. A process as described in claim 1, including diluting with an aqueous diluent the mass which remains after treating the cellulose with the said solution in the presence of the said substance.

3. A process as described in claim 1, including diluting the mass, which remains after treating the cellulose with the said solution and in the presence of the said substance, with a weak sodium hydroxide solution in amount to produce a sodium hydroxide content of not over about 10% in the resulting solution.

4. A process for producing a cellulose solution which consists essentially of swelling a cellulose with a solution of zinc oxide in caustic soda having a total alkali content of at least 20% calculated as sodium hydroxide, in the presence of ethylene chlorohydrin, and diluting the mass with an aqueous diluent.

5. A process for producing a cellulose solution which consists essentially of swelling a cellulose with a solution of zinc oxide in caustic soda having a total alkali content of at least 20% calculated as sodium hydroxide, adding chloroacetic acid, and diluting the mass with an aqueous diluent.

6. A process for producing a cellulose solution which consists essentially of swelling a cellulose with a solution of zinc oxide in caustic soda having a total alkali content of at least 20% calculated as sodium hydroxide, adding chloromethylethyl ether, and diluting the mass with an aqueous diluent.

7. A process for producing a cellulose solution which consists essentially of swelling a cellulose with a solution of zinc oxide in caustic soda having a total alkali content of at least 20% calculated as sodium hydroxide, in the presence of epichlorohydrin and diluting the mass with an aqueous diluent.

8. A process for producing a cellulose solution which consists essentially of swelling a cellulose with a zinc oxide solution in sodium hydroxide having an alkali content of at least about 20% calculated as sodium hydroxide in the presence of a small amount of a chlorohydrin, allowing the mixture to stand at room temperature, and diluting it with an aqueous diluent so that it has an alkali content of not over about 10% calculated as sodium hydroxide to produce a relatively stable solution.

9. A cellulose solution consisting essentially of cellulose dissolved in a solvent prepared from a solution of zinc oxide and sodium hydroxide having an alkali constant calculated as sodium hydroxide of at least 20% in the presence of a small quantity of epichlorohydrin.

10. A cellulose solution consisting essentially of a cellulose dissolved in a solvent prepared from a solution of zinc oxide and sodium hydroxide having an alkali content calculated as sodium hydroxide of at least 20% in the presence of a small quantity of chloracetic acid.

ERNST WEISS.

REFERENCES CITED

The following references are of record in the file of this patent:

UNITED STATES PATENTS

| Number | Name | Date |
|---|---|---|
| 1,502,379 | Dreyfus | July 22, 1924 |
| 2,120,513 | Stahn | June 14, 1938 |
| 2,289,085 | Halewijn | July 7, 1942 |
| 2,322,427 | Edelstein | June 22, 1943 |
| 2,416,998 | Hewitt | Mar. 4, 1947 |
| 2,465,520 | Edelstein | Mar. 29, 1949 |